United States Patent Office 3,305,299
Patented Feb. 21, 1967

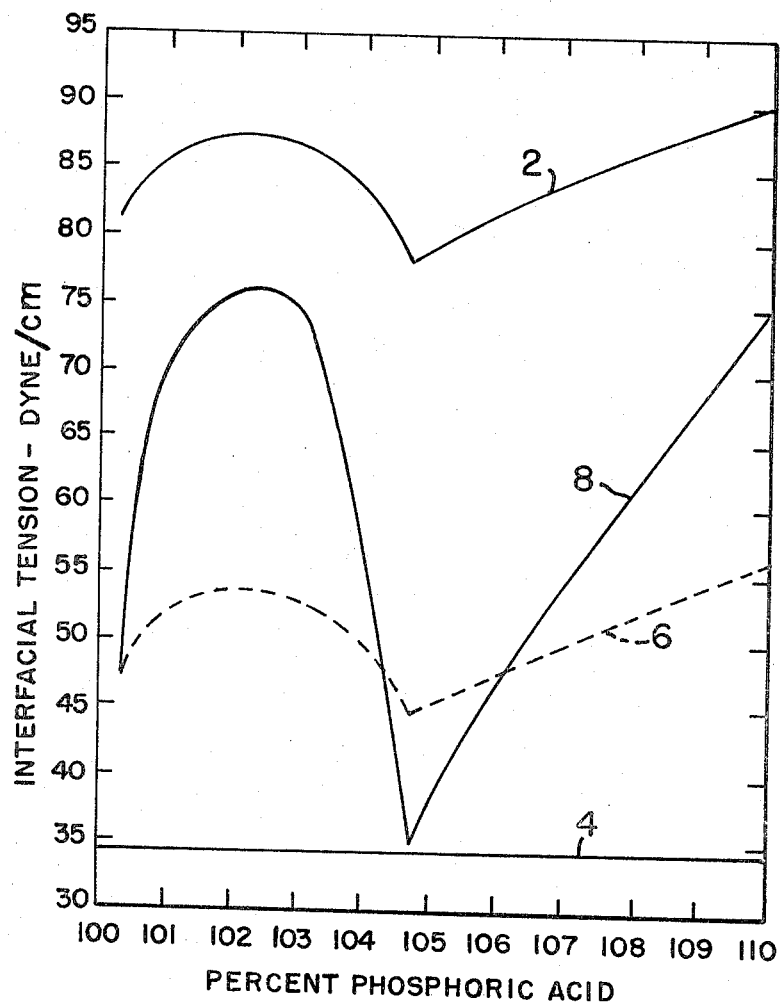

3,305,299
FREEZING INHIBITORS FOR SUPER
PHOSPHORIC ACID
Leon Erwin Cohen, Franklin Township, Somerset, and
Irwin A. Lichtman, Oradell, N.J., assignors to FMC
Corporation, New York, N.Y., a corporation of Delaware
Filed Nov. 29, 1962, Ser. No. 240,957
1 Claim. (Cl. 21—60.5)

This invention relates to a method for preventing super phosphoric acid from freezing on storage, and more particularly to a method for inhibiting the freezing of super phosphoric acid having 104.2 to 106.2% $H_3PO_4$.

Super phosphoric acid having concentrations of from about 101 to 106% $H_3PO_4$ has been in increased demand for use in fertilizer formulations. This demand is due to the higher assay liquid fertilizers which can be obtained by using super phosphoric acid, thereby placing them on a competitive basis with high-assay solid fertilizer. Additionally, freight costs for shipping super phosphoric acid are reduced on a $P_2O_5$ basis even beyond the expected savings for weight alone. For example, for a given weight of $P_2O_5$, 105% super acid occupies only 58% of the volume of 75% phosphoric acid.

This increased demand for superphosphoric acid is a seasonal demand which takes place during the periods when agricultural fertilizing takes place. While the quantity of super phosphoric acid employed in a calendar year is large, most of the phosphoric acid is required during only one or two months of the year. In order to meet this seasonal demand, super phosphoric producers operate their plants throughout the year and store their product in anticipation of the periodic seasonal demand. Since most of the plants are unable to produce the amount of super phosphoric acid required by operating their plants only during the seasonal demand periods, storage is a necessary part of the phosphoric acid producers operation.

A serious problem which has arisen during storage of the super phosphoric acid is the freezing of the acid when subjected to outdoor winter storage. Freezing takes place at relatively high temperatures; for example, super phosphoric acids having concentrations of 101%, 104%, and 108% have freezing temperatures of 100° F., 62° F. and 125° F., respectively. Since a high proportion of the super phosphoric acid is produced in the midwestern portion of the United States where winters are particularly long and severe, the problem of superphosphoric acid freezing is particularly acute. Once the acid freezes it becomes virtually impossible to remove it from its storage container until it has been heated and remelted. One method for overcoming the problem of freezing of this acid is to employ hot water heating coils, air heaters or other means of supplying heat to the phosphoric acid. This is generally undesirable because it requires large capital investments to equip the storage tanks with special heating coils or other heating devices to heat, melt, and maintain the acid liquid during the seasonal supply period to facilitate pumping the acid out of its storage container. Nevertheless, in the absence of expensive external heating systems, no method has heretofore been found for overcoming the freezing of super phosphoric acid during outside storage.

It is an object of the present invention to prevent super phosphoric acid having concentrations of from 104.2 to 106.2% $H_3PO_4$ from freezing during outside storage without employing heating means.

It has now been found that concentrated phosphoric acid having a concentration of from 104.2 to 106.2% $H_3PO_4$ can be prevented from freezing during outside storage by placing a liquid layer on the surface of the phosphoric acid of a liquid aliphatic or naphthenic hydrocarbon or mixtures of these hydrocarbons, provided that the interfacial surface tension ($\gamma_{ab}$) between the liquid hydrocarbon and the super phosphoric acid is substantially less than the term $$(\gamma_a - \gamma_b)$$

where $\gamma_a$ is the interfacial tension of the super phosphoric acid and air, and $\gamma_b$ is the interfacial tension of the liquid hydrocarbon and air.

It is quite unexpected to find that freezing of the entire quantity of the super phosphoric acid can be prevented by preventing freezing at the surface of the super acid. We have established that freezing of super phosphoric acids in sealed containers, in the absence of seed crystals or contaminants that can act as a nuclei for seed growth, occurs only at the acid surface. This freezing is not merely that which is due to the pick-up of atmospheric moisture by the highly hygroscopic acid; such freezing is known to occur because the highly viscous acid does not allow the water to diffuse throughout the acid but concentrates it in a surface layer where it reacts with the acid to alter its composition rendering it more easily freezable. In the present situation, however, thin layers of super cooled phosphoric acid will begin to freeze at the surface after 24 hours at 45° F. even under anhydrous conditions.

In the present process, freezing has been prevented only in super phosphoric acids containing from 104.2 to 106.2% $H_3PO_4$. Further, freezing of the phosphoric acid has only been prevented when coated with a liquid hydrocarbon where the liquid hydrocarbon-acid interfacial tension ($\gamma_{ab}$) was substantially below the value of the air-acid interfacial tension ($\gamma_a$) minus the air-liquid hydrocarbon interfacial tension ($\gamma_b$). This can be expressed as $\gamma_{ab}\gamma_a - \gamma_b$. The well known Antonoff's Rule $\gamma_{ab} = \gamma_a - \gamma_b$ has been found to deviate in a positive direction with respect to the value of $\gamma_{ab}$ in many systems where the phosphoric acid is coated with a liquid hydrocarbon. However, inhibitors that are effective in preventing freezing are only obtained in those systems where negative deviators to Antonoff's Rule are found. These are found to exist only at phosphoric acid concentrations of 104.2 to 106.2%.

The present invention can best be described with reference to the drawing. In the drawing the interfacial tensions in dynes per centimeters are plotted vs. phosphoric acid concentrations. Curve 2 represents the interfacial tension between air and phosphoric acid. Curve 4 represents the interfacial tension between a liquid hydrocarbon "Nujol" hereinafter defined and air. Curve 6 represents the theoretical calculated liquid hydrocarbon-acid interfacial tension calculated in accordance with Antonoff's Rule $\gamma_{ab} = \gamma_a - \gamma_b$ and curve 8 represents the actual liquid hydrocarbon-acid interfacial tension which was obtained. As will be observed in the drawing the *actual* interfacial tension values ($\gamma_{ab}$) shown by curve 8 are generally greater than the *calculated* interfacial tension ($\gamma_{ab}$) shown by curve 6. That is, the actual surface tension values show a deviation which in general is numerically higher than the calculated surface tension values. One extremely important exception to this positive deviation is found in super phosphoric acid having concentrations of 104.2 to 106.2% $H_3PO_4$. Within this range, the actual interfacial values ($\gamma_{ab}$) shown by curve 8 are numerically less than the calculated interfacial values ($\gamma_{ab}$) shown by curve 6. It is only within this narrow negative deviation to Antonoff's Rule that freezing of super phosphoric acid has been inhibited. The liquid hydrocarbon which is employed in the present process to prevent freezing of the super phosphoric acid must meet two conditions. Initially the phosphoric acid-liquid hydrocarbon interfacial tension must exhibit a substantial negative deviation from the calculated interfacial tension value obtained in accordance with Antonoff's Rule. Secondly, the liquid hydrocarbon must be chemically inert to the super phosphoric acid.

The required chemical inertness rules out the use of aromatic hydrocarbons such as toluene, xylene or benzene since the presence of these compounds in material amounts causes the formation of a deep color in the acid. In addition, the presence of reactive groups such as found in various commercial glycols and various glycol derivatives have been found unacceptable because they are reactive with the super phosphoric acid in esterification reactions.

One liquid hydrocarbon which has been particularly effective is a mineral oil distributed by Plough Inc. This product is made up of 64% paraffins and 36% cyclo paraffins, and has an average molecular weight of 181. This product has the physical characteristics listed in Table I. Other liquid hydrocarbons which have been found suitable are Bayol 16 and Bayol 50 which are both manufactured by Esso Standard Oil Company. These products have the physical properties listed in Table I. Additionally, Lactol Spirits (E-1) manufactured by American Mineral Spirits Company and having the physical properties listed in Table I has also been found suitable.

listed in Table III. The temperature of the static freezing test was 45° F.

TABLE III

| Coating Oil | Concentration of $H_3PO_4$ | | | | |
|---|---|---|---|---|---|
| | 104.0% | 104.5% | 104.8% | 106.0% | 106.5% |
| Nujol | F[1] | NF[2] | NF | NF | F |
| Bayol 16 | F | NF | NF | NF | F |
| Bayol 50 | F | NF | NF | NF | F |
| Lactol Spirits E-1 | F | NF | NF | NF | F |

[1] Acid becomes frozen after 24 hour storage.
[2] No freezing for at least a month.

In the above example the coating oil-acid interfacial tensions deviated in a positive direction from the calculated values based on Antonoff's Rule, at acid concentrations of 104.0 and 106.5% whereas the coating oil-acid interfacial tensions deviated in a negative direction at acid concentrations of 104.5, 104.8 and 106.0.

Pursuant to the requirements of the Patent Statutes, the principle of this invention has been explained and exemplified in a manner so that it can be readily practiced by those skilled in the art, such exemplification including what is considered to represent the best embodiment of

TABLE I

| Components | Coating Oil | Viscosity Saybolt Seconds at— | | Specific Gravity (60° F.) | Refractive Index | | | Distillation Range (° F.) IBP/FBP |
|---|---|---|---|---|---|---|---|---|
| | | 100° F. | 210° F. | | 20° C. | 25° C. | 50° C. | |
| 64% paraffins, 36% cyclo paraffins | Nujol | 369 | 54.2 | 0.8836 | 1.4805 | 1.4785 | 1.4701 | 740/975 |
| 77.1% paraffins, 22.9% cyclo paraffins | Bayol 50 | 50 | 33.4 | 0.8268 | 1.4560 | 1.4542 | 1.4448 | 544/789 |
| 47% paraffins, 53% cyclo paraffins | Bayol 16 | 87 | 38.0 | 0.8677 | 1.4727 | 1.4712 | 1.4619 | 676/935 |
| Paraffin | Amsco Lactol Spirits | | | 0.7297 | | | | 200/232 |

The following examples are given as illustrative of the present invention but are not intended as limiting thereof.

*Example 1*

Equal quantities of 104.8% phosphoric acid were placed in a series of clean glass beakers. A layer of each of the coating oils listed in Table 2 was placed on a sample of the acid to give a uniform surface coating over the acid. The interfacial tension was then determined for the acid-oil interface by means of a DuNouy tensiometer. These tests were carried out at room temperatures.

After the surface tension measurements were performed beakers were placed in a constant temperature cabinet held at 45° F., and examined periodically for signs of freezing. The results of this test are given in Table II.

the invention. However, it should be clearly understood that, within the scope of the appended claim, the invention may be practiced by those skilled in the art, and having the benefit of this disclosure, otherwise than as specifically described and exemplified herein.

What is claimed is:

A process for preventing the freezing of super phosphoric acid having a concentration of from 104.2 to 106.2% $H_3PO_4$ which comprises placing on the surface of said phosphoric acid a liquid layer of a hydrocarbon selected from the group consisting of a liquid aliphatic hydrocarbon and a liquid naphthenic hydrocarbon, in which the interfacial tension ($\gamma_{ab}$) between said hydrocarbon and said super phosphoric acid is substantially less than the value of $$\gamma_a - \gamma_b$$

TABLE II

| Coating Oil | Oil-Acid Interfacial Tension, Dyne/cm. | | | Results of Static Freezing Tests (45° F.) |
|---|---|---|---|---|
| | Test Result | Calculated Result | Deviation | |
| Nujol | 36.3 | 44.9 | −8.6 | Unfrozen after 1 year. |
| Bayol 16 | 38.1 | 45.3 | −7.2 | Unfrozen after 6 mos. |
| Bayol 50 | 38.2 | 47.6 | −9.4 | Unfrozen after 2 mos. |
| Lactol Spirits E-1 | 41.9 | 55.0 | −13.1 | Unfrozen after 10 mos. |
| Normal Heptane | 54.3 | 56.5 | −2.2 | Began to freeze in 1 day. |

*Example 2*

The following tests were run to determine at what concentrations of super phosphoric acid the freezing inhibitors were effective. The procedure employed in Example 1 was repeated except that the concentrations of super phosphoric acid samples were varied within the values where $\gamma_a$ is the interfacial tension of said super phosphoric acid and air, and $\gamma_b$ is the interfacial tension of said hydrocarbon and air.

(References on following page)

References Cited by the Examiner

UNITED STATES PATENTS

| | | | |
|---|---|---|---|
| 1,385,075 | 7/1921 | Ferguson | 21—60.5 X |
| 1,499,611 | 7/1924 | Gravell | 23—165 |
| 2,005,944 | 6/1935 | Malishev | 23—165 |
| 3,072,460 | 1/1963 | Young et al. | 23—165 |
| 3,118,730 | 1/1964 | Nickerson | 23—165 |

MORRIS O. WOLK, *Primary Examiner.*

J. ZATARGA, *Assistant Examiner.*